United States Patent
Hershey et al.

(10) Patent No.: US 10,345,178 B2
(45) Date of Patent: Jul. 9, 2019

(54) PRESSURE SENSOR HEADER WITH IMPROVED INPUT PRESSURE WITHSTAND CAPABILITY

(71) Applicant: Honeywell International Inc., Morris Plains, NJ (US)

(72) Inventors: George Hershey, Blue Bell, PA (US); Richard D. Daugert, Doylestown, PA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 147 days.

(21) Appl. No.: 15/637,292

(22) Filed: Jun. 29, 2017

(65) Prior Publication Data

US 2018/0259415 A1 Sep. 13, 2018

Related U.S. Application Data

(60) Provisional application No. 62/469,716, filed on Mar. 10, 2017, provisional application No. 62/469,954, (Continued)

(51) Int. Cl.
*G01L 7/08* (2006.01)
*G01L 19/06* (2006.01)
(Continued)

(52) U.S. Cl.
CPC ............ *G01L 19/0618* (2013.01); *G01L 7/08* (2013.01); *G01L 7/082* (2013.01); *G01L 11/004* (2013.01);
(Continued)

(58) Field of Classification Search
CPC . G01L 7/08; G01L 7/082; G01L 11/00; G01L 11/004; G01L 13/02; G01L 13/026;
(Continued)

(56) References Cited

U.S. PATENT DOCUMENTS 4,539,850 A * 9/1985 Ziegler ................. G01L 13/025
73/706
4,612,227 A 9/1986 Lam et al.
(Continued)

FOREIGN PATENT DOCUMENTS

JP 05079871 A * 3/1993 ............. G01F 1/363

OTHER PUBLICATIONS

Honeywell; "ST 800 SmartLine Pressure Transmitters User's Manual"; 34-ST-25-35 Revision 10; Jul. 2016; 122 pages.
(Continued)

*Primary Examiner* — Nguyen Q. Ha
(74) *Attorney, Agent, or Firm* — Loza & Loza LLP; Luis M. Ortiz; Kermit D. Lopez

(57) ABSTRACT

An apparatus includes a header containing a sensor configured to measure pressure and a sensor body connected to the header, where the sensor body and the header form a pressure vessel configured to receive an input pressure. The header is connected to the sensor body such that the input pressure received on an inner surface of the header is substantially equal to the input pressure received on an outer surface of the header. A lowest connection point of the header to the sensor body may be located at or above a highest point at which the input pressure extends into the header. A lower portion of the header may be unconnected to the sensor body and extend into an interior volume of the sensor body. The header may include a vent configured to expose the sensor to atmospheric pressure or a lower-pressure input pressure.

21 Claims, 5 Drawing Sheets

Related U.S. Application Data filed on Mar. 10, 2017, provisional application No. 62/470,080, filed on Mar. 10, 2017, provisional application No. 62/470,089, filed on Mar. 10, 2017.

(51) Int. Cl.
| | | |
|---|---|---|
| *G01L 19/14* | (2006.01) | |
| *G01L 13/02* | (2006.01) | |
| *G01L 11/00* | (2006.01) | |
| *G01L 15/00* | (2006.01) | |

(52) U.S. Cl.
CPC ........ *G01L 13/026* (2013.01); *G01L 19/0645* (2013.01); *G01L 19/0663* (2013.01); *G01L 19/14* (2013.01); *G01L 15/00* (2013.01)

(58) Field of Classification Search
CPC ..... G01L 15/00; G01L 19/06; G01L 19/0618; G01L 19/0663; G01L 19/14
See application file for complete search history.

(56) References Cited

U.S. PATENT DOCUMENTS

| | | |
|---|---|---|
| 4,764,747 A | 8/1988 | Kurtz et al. |
| 5,709,337 A | 1/1998 | Moser et al. |
| 6,091,022 A | 7/2000 | Bodin |
| 7,013,735 B2 | 3/2006 | Miyazawa |
| 7,526,962 B1 * | 5/2009 | Kurtz ..................... G01L 15/00 73/716 |
| 8,371,175 B2 | 2/2013 | Romo |
| 2008/0121043 A1 | 5/2008 | Kurtz et al. |
| 2008/0229838 A1 | 9/2008 | Kleven et al. |
| 2014/0209220 A1 | 7/2014 | Otomo et al. |
| 2015/0101416 A1 | 4/2015 | Martin et al. |
| 2016/0223420 A1 * | 8/2016 | Grimes ............... G01L 19/0618 |

OTHER PUBLICATIONS

International Search Report and Written Opinion of the International Searching Authority for International Patent Application No. PCT/US2018/021290 dated Jun. 4, 2018, 13 pages.

\* cited by examiner

PRESSURE SENSOR HEADER WITH IMPROVED INPUT PRESSURE WITHSTAND CAPABILITY

CROSS-REFERENCE TO RELATED APPLICATIONS AND PRIORITY CLAIM

This application claims priority under 35 U.S.C. § 119(e) to the following U.S. provisional patent applications:
U.S. Provisional Patent Application No. 62/469,716 filed on Mar. 10, 2017;
U.S. Provisional Patent Application No. 62/469,954 filed on Mar. 10, 2017;
U.S. Provisional Patent Application No. 62/470,080 filed on Mar. 10, 2017; and
U.S. Provisional Patent Application No. 62/470,089 filed on Mar. 10, 2017.
All of these provisional applications are hereby incorporated by reference in their entirety.

TECHNICAL FIELD

This disclosure generally relates to pressure sensors. More specifically, this disclosure relates to a pressure sensor header with an improved input pressure withstand capability.

BACKGROUND

For certain types of pressure sensors (such as piezoresistive sensors), an input pressure is applied to one side of the sensor, and the sensor outputs an electrical signal based on the input pressure. The electrical signal typically needs to pass through the wall of a pressure vessel that contains the input pressure. To allow this, an electrical conductor is often passed through an opening in a header of the pressure sensor, and the opening is sealed to maintain the pressure in the pressure vessel during use.

In one conventional approach, a glass-to-metal compression seal is used in the header of a pressure sensor to allow the transfer of an electrical signal through the wall of a pressure vessel. However, this approach comes with a pressure limitation, namely that excessive pressure in the pressure vessel can cause the header to expand. For example, many conventional headers are welded along their top and bottom edges to larger sensor bodies. In this arrangement, the sides of a conventional header can deflect outward along the entire height of the header when an excessive input pressure is received at the header. This deflection expands the size of the header. The expansion of the header can reduce or eliminate the compression of the glass-to-metal seal, causing the seal and thus the header to fail. This problem worsens as the header and the pressure vessel become smaller.

SUMMARY

This disclosure provides a pressure sensor header with an improved input pressure withstand capability.

In a first embodiment, an apparatus includes a header containing a sensor configured to measure pressure and a sensor body connected to the header, where the sensor body and the header form a pressure vessel configured to receive an input pressure. The header is connected to the sensor body such that the input pressure received on an inner surface of the header is substantially equal to the input pressure received on an outer surface of the header.

In a second embodiment, a system includes a manifold and a pressure sensor mounted to the manifold. The pressure sensor includes a header containing a sensor configured to measure pressure and a sensor body connected to the header, where the sensor body and the header form a pressure vessel configured to receive an input pressure. The header is connected to the sensor body such that the input pressure received on an inner surface of the header is substantially equal to the input pressure received on an outer surface of the header.

In a third embodiment, a method includes conveying an input pressure to a pressure sensor and generating a pressure measurement based on the input pressure using the pressure sensor. The pressure sensor includes a header containing a sensor and a sensor body connected to the header, where the sensor body and the header form a pressure vessel that receives the input pressure. The header is connected to the sensor body such that the input pressure received on an inner surface of the header is substantially equal to the input pressure received on an outer surface of the header.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
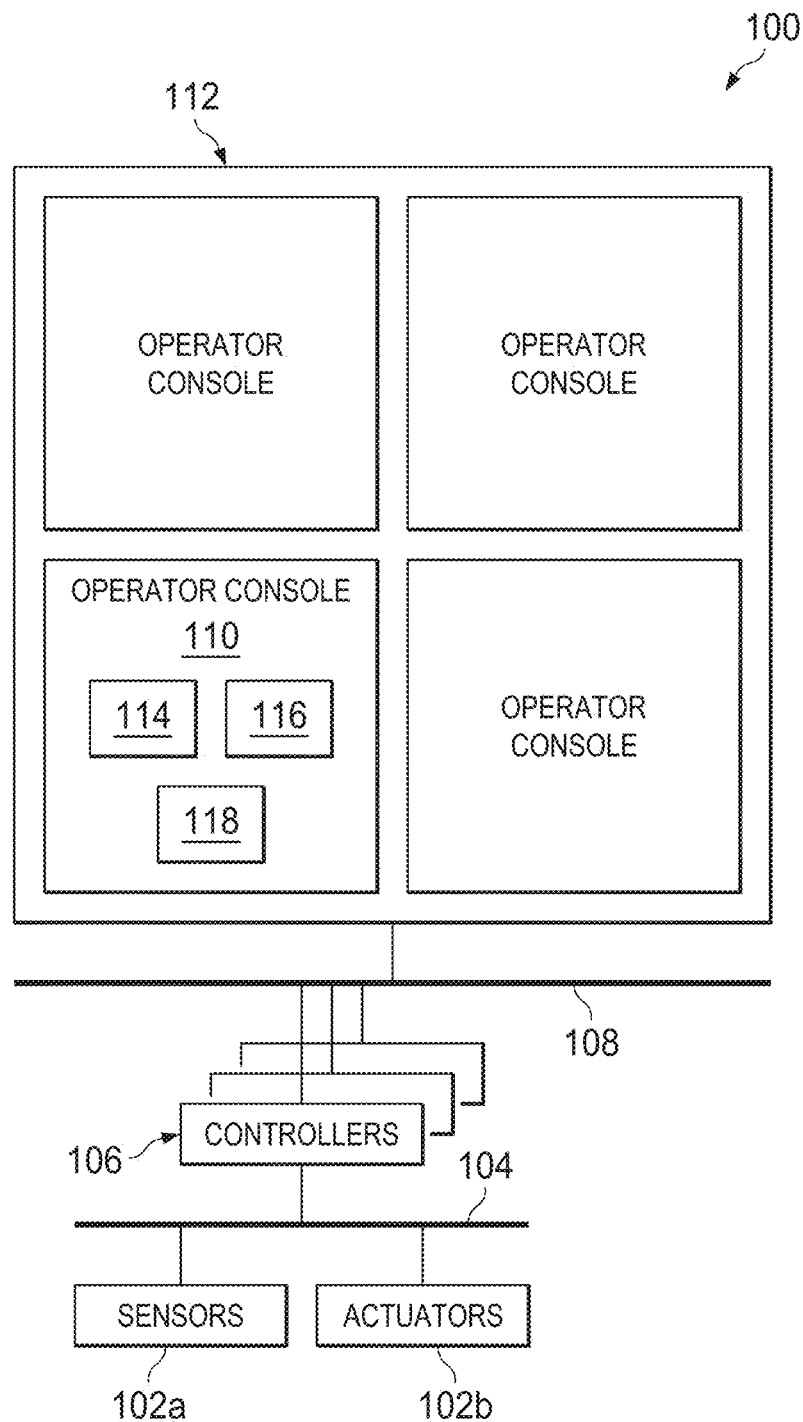
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

Each operator console 110 includes any suitable structure for displaying information to and interacting with an operator. For example, each operator console 110 could include one or more processing devices 114, such as one or more processors, microprocessors, microcontrollers, field programmable gate arrays, application specific integrated circuits, discrete logic devices, or other processing or control devices. Each operator console 110 could also include one or more memories 116 storing instructions and data used, generated, or collected by the processing device(s) 114. Each operator console 110 could further include one or more network interfaces 118 that facilitate communication over at least one wired or wireless network, such as one or more Ethernet interfaces or wireless transceivers.

At least one of the sensors 102a in FIG. 1 could represent a pressure sensor. As noted above, some pressure sensors require that an electrical conductor pass through the wall of a pressure vessel containing an input pressure, where the electrical conductor carries sensor measurements from the sensor. However, a glass-to-metal compression seal used to seal the electrical conductor within a header of the pressure sensor can fail if the header expands, such as due to excessive input pressures.

In accordance with this disclosure, a technique is provided for reducing the expansion of a pressure sensor header based on input pressure. As a result, glass-to-metal compression seals or other compression seals used in the header are more likely to remain intact and less likely to fail. This technique therefore allows a pressure sensor to receive and measure higher input pressures without failure, which can expand the operational range of the pressure sensor by increasing its header pressure withstand capability. This approach also allows lower-pressure devices to be manufactured more cost-efficiently by reducing the size and wall thickness of the header and its surrounding parts. In addition, pressure sensors can be manufactured in smaller and lighter forms, which can increase their ease of installation.

Additional details regarding a pressure sensor having a header with improved input pressure withstand capability are provided below. Note that these details relate to specific implementations of the pressure sensor and that other implementations could vary as needed or desired.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which a pressure sensor could be used.

Figure 2:
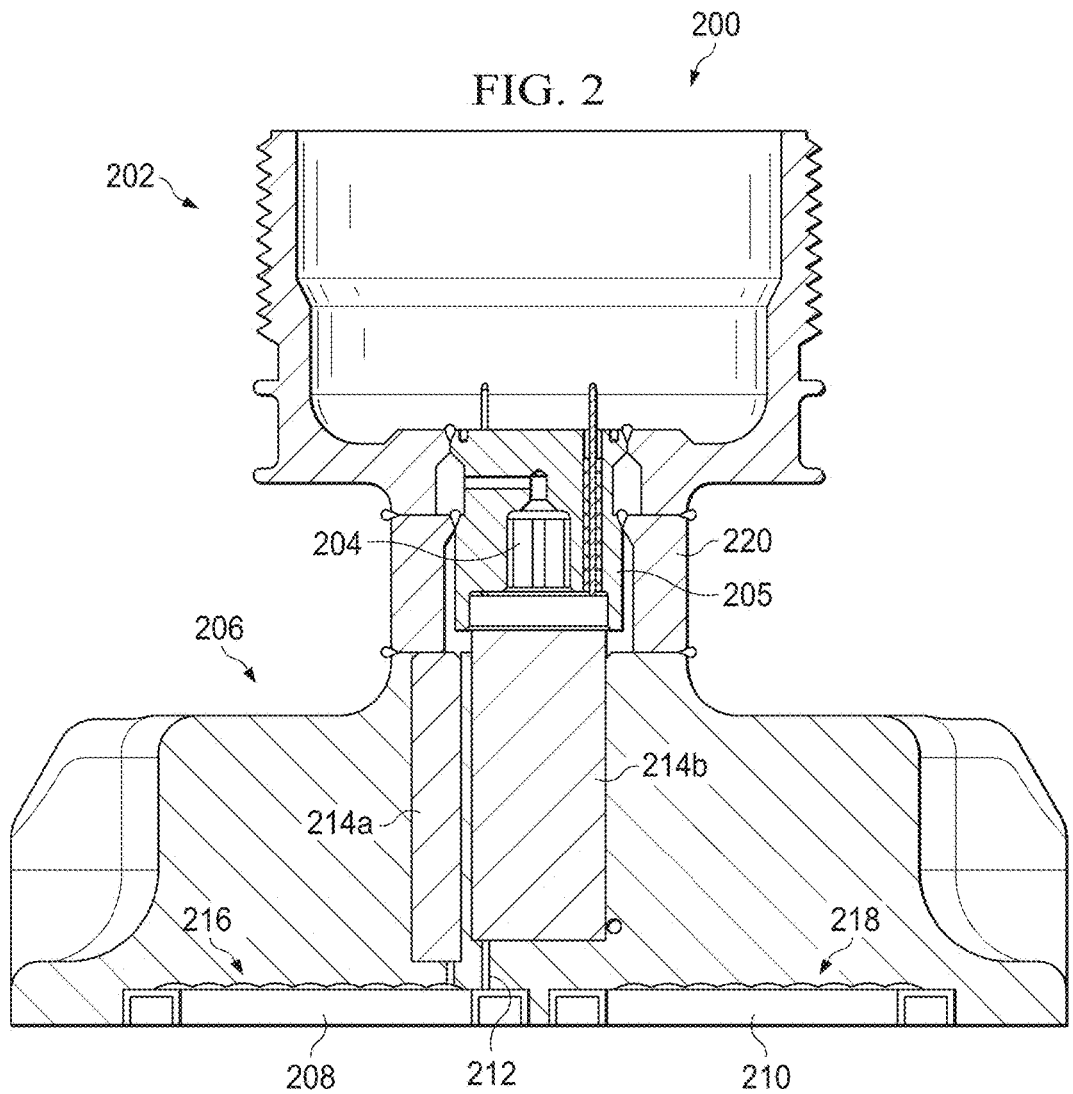
FIG. 2 illustrates an example pressure sensor according to this disclosure.

FIG. 2 illustrates an example pressure sensor 200 according to this disclosure. For ease of explanation, the pressure sensor 200 may be described as being used in the industrial process control and automation system 100 of FIG. 1.

However, the pressure sensor 200 could be used in any other suitable system, and the system need not relate to industrial process control and automation.

As shown in FIG. 2, the pressure sensor 200 includes an adapter 202 and at least one sensor 204 within a header 205. The adapter 202 denotes a portion of the pressure sensor 200 in which wires or other signal conductors can be connected to the sensor 204. The outer surface of the adapter 202 can also be threaded or otherwise configured to facilitate attachment of the pressure sensor 200 to a larger device or system. The adapter 202 could be formed from any suitable material(s) and in any suitable manner. As a particular example, the adapter 202 could be formed from metal.

The sensor 204 denotes a structure that senses one or more input pressures and that outputs at least one signal based on the input pressure(s). For example, the sensor 204 could output an electrical signal whose voltage or current varies proportionally with a single pressure or with a differential pressure. The sensor 204 includes any suitable pressure sensor, such as a piezo-resistive or capacitive sensor. Multiple sensors 204 could also be used, such as sensors that output both differential and static pressure measurements. Also, the multiple sensors 204 may or may not be implemented on a single integrated circuit chip. Each sensor 204 includes any suitable structure for measuring pressure.

The header 205 denotes a structure that holds the sensor 204 and that enables electrical connection to the sensor 204 through the header 205. The header 205 could have any suitable size, shape, and dimensions. The header 205 could also be formed from any suitable material(s), such as metal. Additional details regarding an example implementation of the header 205 are provided below with respect to FIG. 4.

The pressure sensor 200 also includes a coplanar body 206, which denotes a portion of the pressure sensor 200 in which multiple pressure inputs are located. The pressure inputs are generally located on a common plane, which is why the body 206 is referred to as a "coplanar" body. The coplanar body 206 could be formed from any suitable material(s) and in any suitable manner. As a particular example, the coplanar body 206 could be formed from metal. Note that the adapter 202 and the coplanar body 206 could be formed integrally or as separate pieces that are connected together, such as by welding. Collectively, the coplanar body 206 and the header 205 can define a pressure vessel in which at least one input pressure is provided to the sensor 204.

The pressure inputs in the pressure sensor 200 are implemented using a high-pressure barrier diaphragm 208 and a low-pressure barrier diaphragm 210. Each of the barrier diaphragms 208 and 210 represents a barrier that allows pressure to be transmitted into the pressure sensor 200 while preventing process fluid (such as oil, gas, or other high pressure and corrosive fluid) from entering into the pressure sensor 200. The barrier diaphragms 208 and 210 represent flexible membranes that can move up or down in FIG. 2 based on the amount of pressure applied to the barrier diaphragms 208 and 210.

Each of the barrier diaphragms 208 and 210 denotes any suitable flexible membrane, such as a metallic membrane. Each of the barrier diaphragms 208 and 210 could also have any suitable size, shape, and dimensions. In particular embodiments, the barrier diaphragms 208 and 210 are small enough and spaced apart to fit within the established bolt pattern for industry-standard DIN manifolds. This allows the pressure sensor 200 to be mounted directly to a manifold.

Pressures from the barrier diaphragms 208 and 210 are transmitted to the sensor 204 via a fill fluid that travels through various passages 212. The fill fluid could denote an incompressible fluid, so pressure applied by the barrier diaphragm 208 or 210 is conveyed by the fill fluid to the sensor 204. The fill fluid denotes any suitable fluid for conveying pressure, such as silicone oil or other suitable fluid. Each passage 212 denotes any suitable passageway for fill fluid.

The pressure sensor 200 may optionally contain fluid expansion compensation elements 214a-214b, which are used to reduce the thermal expansion effect of the fill fluid. In some embodiments, it may be necessary or desirable to reduce or minimize the fluid travel of the fill fluid through the passages 212. However, this may be complicated by the need to operate the pressure sensor 200 over a large temperature range. Since the fluid expansion properties of the fill fluid may greatly exceed those of the body 206, this results in a larger volume of fluid as the temperature increases. To help handle this issue, the fluid expansion compensation elements 214a-214b can be used and denote cylindrical or other components that encircle or surround various ones of the passages 212. The fluid expansion compensation elements 214a-214b can be formed using a low thermal expansion material, such as INVAR (FeNi36 or 64FeNi) or other material with low thermal expansion as compared to the material of the coplanar body 206.

Each barrier diaphragm 208 and 210 has an associated overload or overpressure protection mechanism 216 and 218, respectively. The protection mechanisms 216 and 218 generally provide protection against overpressure conditions that can damage the pressure sensor 200. Here, the protection mechanisms 216 and 218 implement separate protection for the sensor 204. Each of the protection mechanisms 216 and 218 includes any suitable structure for providing structural reinforcement and overpressure protection. Each of the protection mechanisms 216 and 218 could, for instance, denote an overload diaphragm that can move, where the associated barrier diaphragm 208 or 210 can nest against the protection mechanism 216 or 218 to prevent further movement of the barrier diaphragm 208 or 210.

In some embodiments, the body 206 of the pressure sensor 200 includes a cover 220, which can be used to cover at least part of an internal cavity within the body 206. The header 205 can be mounted in or to cover 220, such as via welding. The use of the cover 220 can provide an easier manufacturing technique for attachment of the body 206 to the header 205. The cover 220 could be formed from any suitable material(s) and in any suitable manner. As a particular example, the cover 220 could be formed from metal. Note, however, that use of the cover 220 is optional and that the header 205 could be attached to the body 206 in other ways.

Although FIG. 2 illustrates one example of a pressure sensor 200, various changes may be made to FIG. 2. For example, the sizes, shapes, and relative dimensions of the components in FIG. 2 are for illustration only. Also, other arrangements of the components in FIG. 2 could be used in a pressure sensor. In addition, the overall form factor for the pressure sensor 200 could vary as needed or desired, and the pressure sensor header described in this patent document could be used in other pressure sensors (including non-differential pressure sensors).

Figure 3:
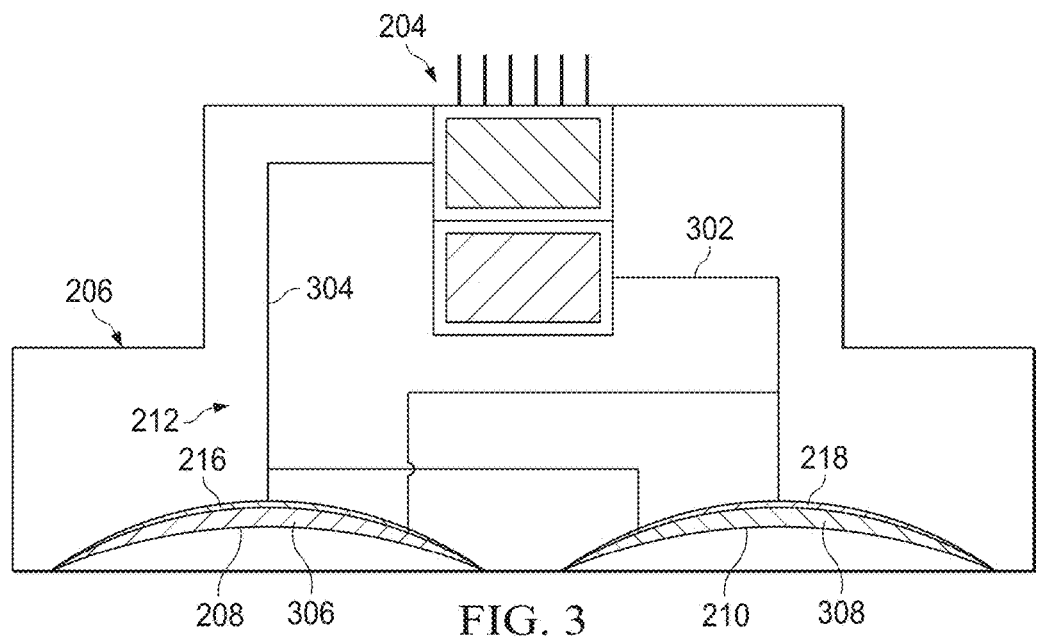
FIG. 3 illustrates example operation of a pressure sensor according to this disclosure.

FIG. 3 illustrates example operation of a pressure sensor according to this disclosure. For ease of explanation, the operations shown in FIG. 3 are described with respect to the differential pressure sensor 200 of FIG. 2. However, these operations could occur using any other suitable pressure sensor.

As shown in FIG. 3, internal porting is implemented in the body 206 using the passages 212 to transfer two pressure inputs to the sensor 204. A high-pressure port 302 provides a higher-pressure input to the sensor 204, and a low-pressure port 304 provides a lower-pressure input to the sensor 204.

A fill fluid 306 fills a gap between the barrier diaphragm 208 and the protection mechanism (overload diaphragm) 216. The fill fluid 306 is ported via the port 302 to both the high-pressure side of the sensor 204 and to a gap between the body 206 and the other protection mechanism (overload diaphragm) 218. Similarly, a fill fluid 308 fills the gap between the barrier diaphragm 210 and the protection mechanism (overload diaphragm) 218. The fill fluid 308 is ported via the port 304 to both the low-pressure side of the sensor 204 and to a gap between the body 206 and the other protection mechanism (overload diaphragm) 216.

During the application of high-side pressure, the pressure is transmitted from the barrier diaphragm 208 to the fill fluid 306 and then to the sensor 204 and to the gap between the other protection mechanism (overload diaphragm) 218 and the body 206. This causes the protection mechanism 218 to deflect away from the body 206, increasing the gap between the body 206 and the protection mechanism 218. Meanwhile, the gap between the barrier diaphragm 208 and the protection mechanism 216 is reduced. When sufficient fill fluid 306 has moved to eliminate the gap between the barrier diaphragm 208 and the protection mechanism 216, the barrier diaphragm 208 and the protection mechanism 216 nest together, and no additional pressure will be transmitted to the sensor 204, thus providing overpressure protection for the sensor 204.

In a similar manner, during the application of low-side pressure, the pressure is transmitted from the barrier diaphragm 210 to the fill fluid 308 and then to the sensor 204 and to the gap between the other protection mechanism (overload diaphragm) 216 and the body 206. This causes the protection mechanism 216 to deflect away from the body 206, increasing the gap between the body 206 and the protection mechanism 216. Meanwhile, the gap between the barrier diaphragm 210 and the protection mechanism 218 is reduced. When sufficient fill fluid 308 has moved to eliminate the gap between the barrier diaphragm 210 and the protection mechanism 218, the barrier diaphragm 210 and the protection mechanism 218 nest together, and no additional pressure will be transmitted to the sensor 204, thus providing overpressure protection for the sensor 204.

Although FIG. 3 illustrates one example of operation of a pressure sensor 200, various changes may be made to FIG. 3. For example, the sizes, shapes, and relative dimensions of the components in FIG. 3 are for illustration only. Also, pressure sensors having other porting could be used.

Figure 4:
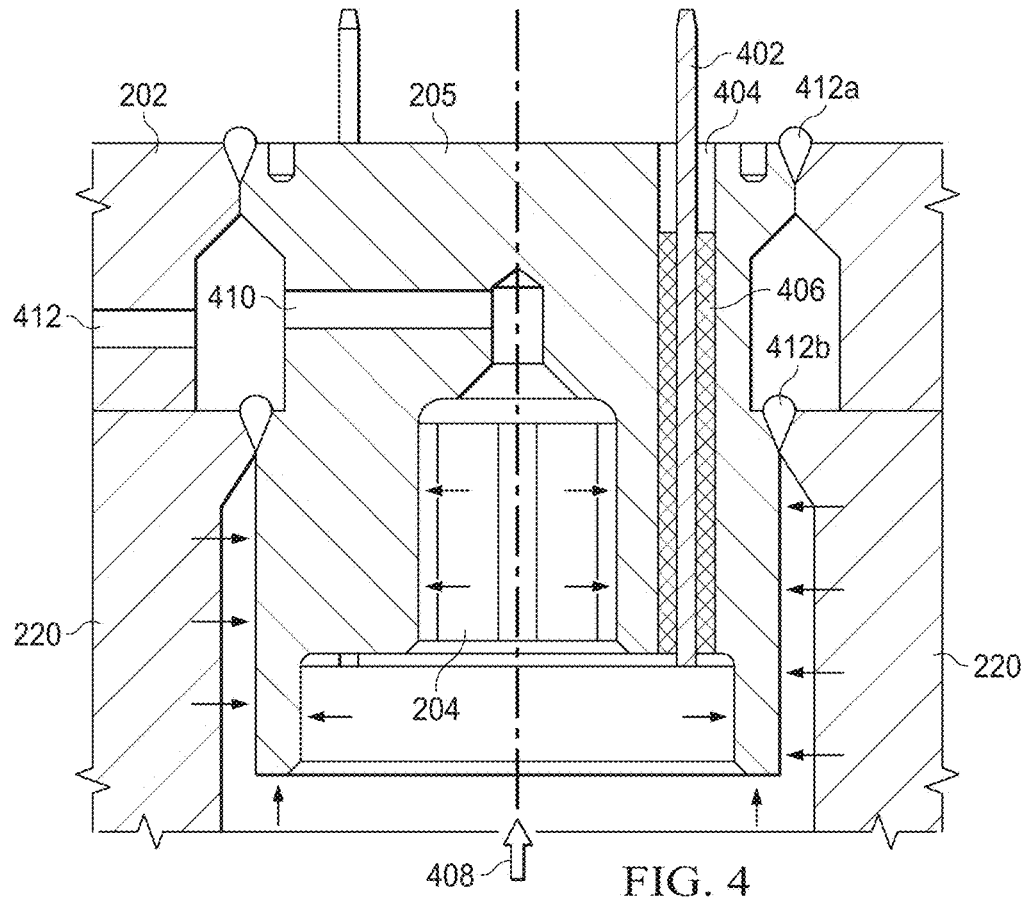
FIG. 4 illustrates an example header for a pressure sensor according to this disclosure.

FIG. 4 illustrates an example header 205 for a pressure sensor according to this disclosure. For ease of explanation, the header 205 shown in FIG. 4 is described with respect to the pressure sensor 200 of FIG. 2. However, the header 205 could be used with any other suitable pressure sensor.

As shown in FIG. 4, the header 205 is used in conjunction with and retains the sensor 204. The sensor 204 generates electrical signals containing sensor measurements, and the electrical signals are transported from the sensor 204 using one or more electrical conductors 402. One or more electrical conductors 402 could optionally be used to provide power to the sensor 204. Each electrical conductor 402 could denote a metallic pin or other conductive structure. Each electrical conductor 402 passes through a hole 404 in the header 205. Each hole 404 could have any suitable size, shape, and dimensions and could be formed in any suitable manner. In some embodiments, each hole 404 could be drilled through the header 205.

Each hole 404 through the header 205 is sealed after insertion of the associated electrical conductor 402 through the hole 404 using a seal 406. Any suitable seal could be used here to seal the hole 404. In some embodiments, each seal 406 denotes a glass-to-metal compression seal or other compression seal. In particular embodiments, each seal 406 denotes a fused glass sleeve. In these types of embodiments, the electrical conductor 402 and the seal 406 are maintained within the hole 404 by a compressive force exerted by the header 205 during a fusing operation.

In this example, the sensor 204 receives an input pressure 408 and atmospheric pressure through a vent 410 (and optionally through a vent 411). Alternatively, in embodiments like the one shown in FIGS. 2 and 3, the sensor 204 receives a higher input pressure 408 from the high-pressure barrier diaphragm 208, and the sensor 204 receives a lower input pressure from the low-pressure barrier diaphragm 210 through the vent 410 (and optionally through the vent 411). The sensor 204 then generates an output signal based on the received pressures. Note that the use of a differential pressure sensor 204 is not required and that other types of sensors could be used.

The header 205 here is attached to the adapter 202 and to the cover 220 of the body 206 at various connection points 412a-412b. Each connection point 412a-412b denotes a connection of the header 205 to another structure, and any suitable connection could be used (such as welding). Note that the header 205 could also be attached to any other structure(s) and that the use of the header 205 with the adapter 202 and the body 206 of the pressure sensor 200 is not required.

Many conventional headers are welded along their top and bottom edges to larger sensor bodies. However, with this arrangement, the sides of a conventional header can deflect outward along the entire height of the header when an excessive input pressure is received at the header. This deflection expands the size of the header and reduces the compressive force applied to a compression seal in the header, which may allow pressure leakage and can cause the header to fail.

As shown in FIG. 4, the lower connection points 412b are not located at the bottom edge of the header 205 but rather near the middle of the header 205. The bottom portion of the header 205 therefore actually extends into the interior volume of the body 206 or into the interior volume of another pressure vessel. Because of this positioning, the input pressure 408 is applied to both the outside of the header 205 and to the inside of the header 205. As a result, the input pressure 408 is more balanced on the inside surfaces and the outside surfaces of the header 205. This can significantly reduce or even eliminate expansion of the header 205 caused by the applied input pressure 408. Thus, the compressive force needed for an effective seal 406 remains, reducing the likelihood of header failure.

Note that the exact location(s) of the connection point(s) 412a-412b can vary as needed or desired. In general, the connection points can be selected so that the input pressure 408 is generally balanced on inner and outer surfaces of the header 205. For instance, in some embodiments, the lowest connection points 412b could be located at or above the highest point at which the input pressure 408 extends into the header 205, although connection points 412b below the highest point could also be used.

Although FIG. 4 illustrates one example of a header 205 for a pressure sensor, various changes may be made to FIG.

4. For example, the sizes, shapes, and relative dimensions of the components in FIG. 4 are for illustration only. As a particular example, the header 205 here is wider at its top and bottom and narrower between its top and bottom, although other shapes for the header 205 could also be used.

Figure 5:
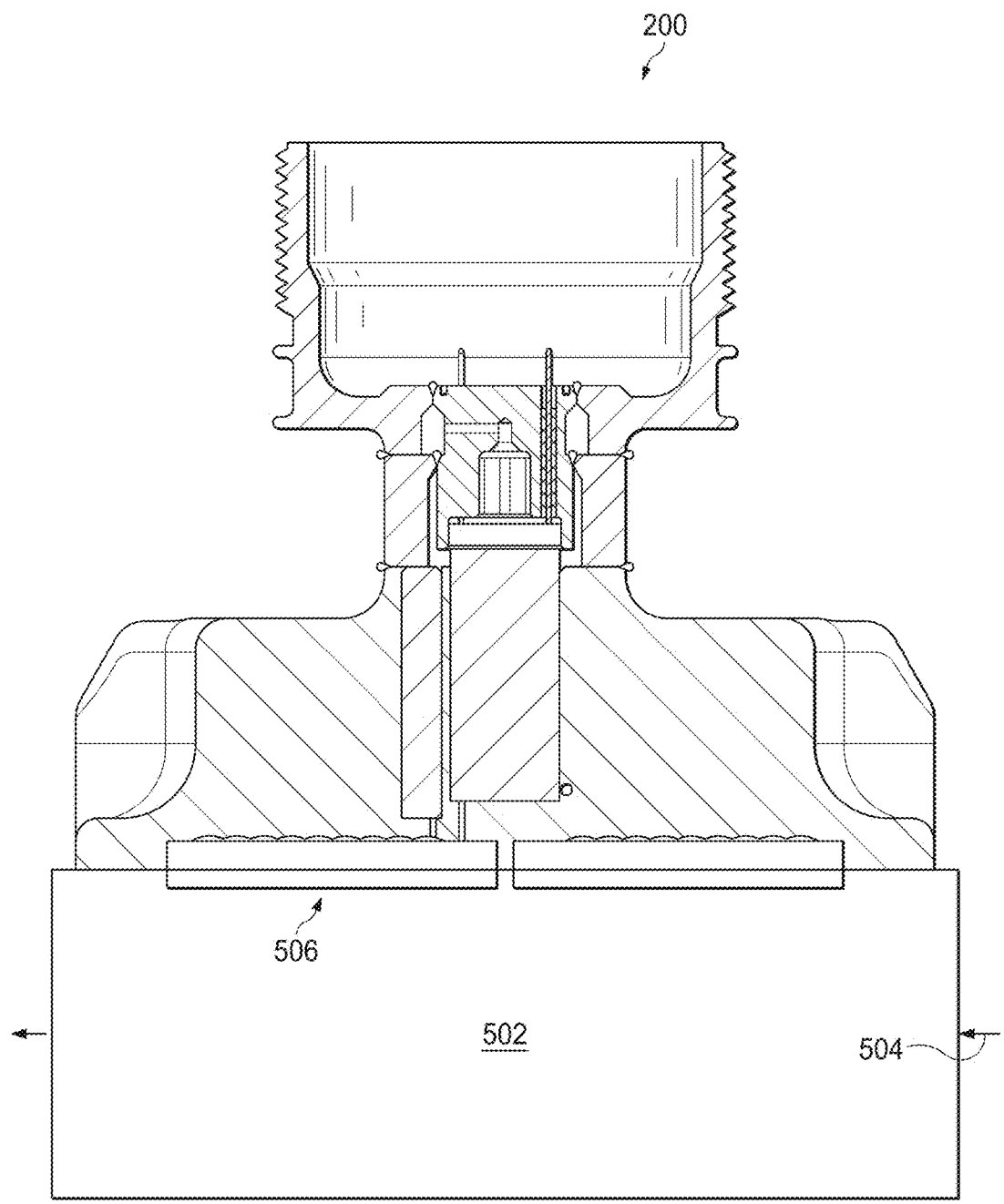
FIG. 5 illustrates an example use of a pressure sensor according to this disclosure.

FIG. 5 illustrates an example use of a pressure sensor according to this disclosure. For ease of explanation, the use shown in FIG. 5 is described with respect to the pressure sensor 200 of FIG. 2. However, the pressure sensor 200 could be used in any other suitable manner.

As shown in FIG. 5, the pressure sensor 200 is mounted directly to a manifold 502. The manifold 502 denotes any suitable structure that is configured to transport at least one process fluid 504. As noted above, the manifold 502 could be configured to transport one or more corrosive process fluids at high pressures. The manifold 502 could have any suitable size, shape, and dimensions and could be formed from any suitable material(s).

The pressure sensor 200 can be mounted directly to openings 506 of the manifold 502. The openings 506 could have any suitable size, shape, and dimensions and could be separated by any suitable distance. As noted above, for example, the manifold 502 could denote an industry-standard DIN manifold, and the barrier diaphragms 208 and 210 can be small enough and spaced apart to fit within the established bolt pattern for the DIN manifold.

Although FIG. 5 illustrates one example use of a pressure sensor 200, various changes may be made to FIG. 5. For example, the pressure sensor 200 could be used in any other suitable manner and need not be used with a manifold.

Figure 6:
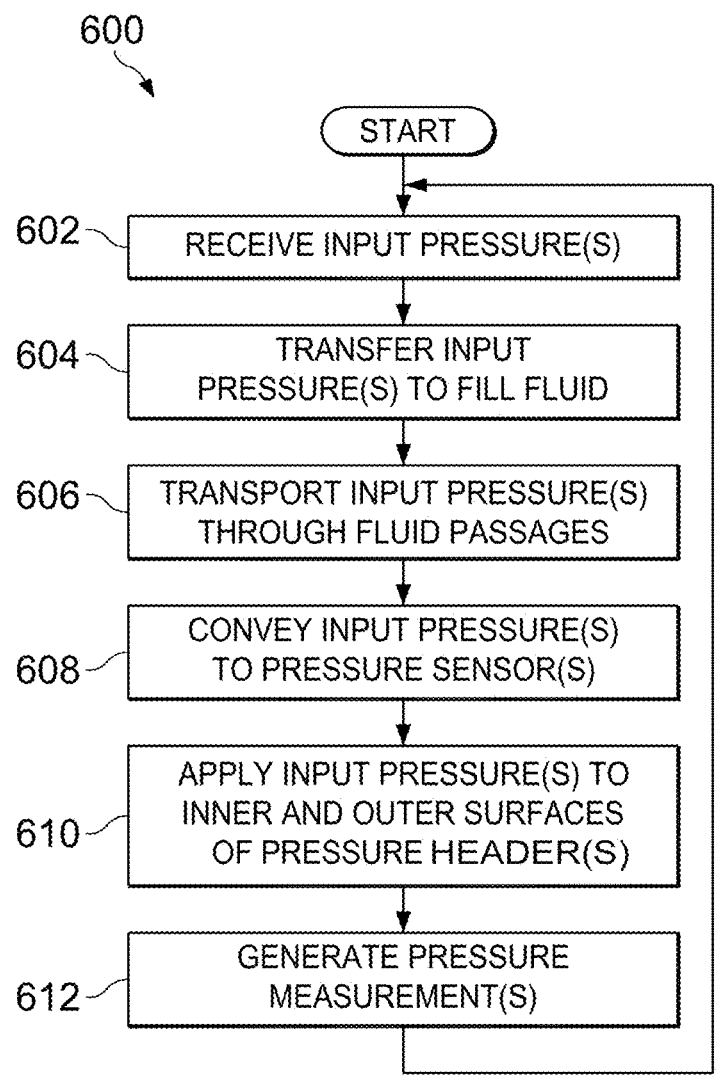
FIG. 6 illustrates an example method for pressure sensing using a pressure sensor having a header with an improved input pressure withstand capability according to this disclosure.

FIG. 6 illustrates an example method 600 for pressure sensing using a pressure sensor having a header with an improved input pressure withstand capability according to this disclosure. For ease of explanation, the method 600 shown in FIG. 6 is described with respect to the pressure sensor 200 of FIG. 2 having the header 205 as shown in FIG. 4. However, the method 600 could be used with any other suitable pressure sensor.

As shown in FIG. 6, one or more input pressures are received at step 602. This could include, for example, receiving input pressures at the barrier diaphragms 208 and 210 of the pressure sensor 200. As a particular example, this could include receiving input pressures at the barrier diaphragms 208 and 210 of the pressure sensor 200 through openings 506 of the manifold 502. The one or more input pressures are transferred to fill fluid at step 604. This could include, for example, the barrier diaphragms 208 and 210 transferring the input pressures to the incompressible fill fluid 306 and 308. The one or more input pressures are transported through various fluid passages at step 606. This could include, for example, the fill fluid 306 and 308 transporting the input pressures through the passages 212.

The one or more input pressures are conveyed to one or more pressure sensors at step 608. This could include, for example, the at least one sensor 204 receiving the input pressure(s) from the fill fluid 306 and 308. At least one of the one or more input pressures is applied to both inner and outer surfaces of at least one of the pressure header 205 at step 610. This could include, for example, the higher input pressure being allowed to enter into the sensor 204 and apply pressure against one or more inner surfaces of the sensor 204. This could also include the higher input pressure being allowed to apply pressure against one or more outer surfaces of the pressure header 205. Ideally, the pressures against the outer and inner surfaces of the pressure header 205 are substantially balanced, helping to prevent significant expansion of the pressure header 205.

One or more pressure measurements are generated at step 612. This could include, for example, the at least one sensor 204 generating an electrical signal whose voltage or current varies proportionally with the input pressure(s). This could also include different sensors 204 generating multiple pressure measurements, such as differential and static pressure measurements.

Although FIG. 6 illustrates one example of a method 600 for pressure sensing using a pressure sensor having a header with an improved input pressure withstand capability, various changes may be made to FIG. 6. For example, while shown as a series of steps, various steps in FIG. 6 could overlap, occur in parallel, occur in a different order, or occur any number of times. Also, the method 600 could use other pressure sensors, including non-differential pressure sensors that do not receive multiple input pressures or include multiple pressure inputs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a header containing a sensor configured to measure pressure;
   a sensor body including a low-pressure side and a high-pressure side connected to the header, the sensor body and the header forming a pressure vessel configured to receive an input pressure, wherein the sensor is disposed between the low-pressure and the high-pressure side and is configured to measure differential pressure and wherein the header is connected to the sensor body such that the input pressure received on an inner surface of the header is substantially equal to the input pressure received on an outer surface of the header; and first and second pressure inputs per each of the low-pressure side and the high-pressure side of the sensor body, the pressure inputs configured to provide multiple input pressures from at least one of the low-pressure side and the high-pressure side to the sensor, each pressure input comprising:
  a barrier diaphragm associated with each of the first and second pressure inputs configured to move in response to pressure; and
  an overload diaphragm associated with each of the first and second pressure inputs configured to limit movement of the barrier diaphragm, wherein the overload diaphragm is configured to exert a preload force against the sensor body.

2. The apparatus of claim 1, wherein the header comprises:
  a hole through the header;
  an electrical conductor extending through the hole and electrically coupled to the sensor; and
  a compression seal around the electrical conductor and sealing the hole.

3. The apparatus of claim 2, wherein the compression seal comprises a glass-to-metal compression seal.

4. The apparatus of claim 1, wherein a lowest connection point of the header to the sensor body is located at or above a highest point at which the input pressure extends into the header.

5. The apparatus of claim 1, wherein a lower portion of the header is unconnected to the sensor body and extends into an interior volume of the sensor body.

6. The apparatus of claim 1, wherein the header comprises a vent configured to expose the sensor to atmospheric pressure or a lower-pressure input pressure.

7. The apparatus of claim 1, wherein the header is connected to the sensor body at multiple weld points.

8. The apparatus of claim 1, wherein the sensor comprises one of multiple sensors.

9. The apparatus of claim 1, wherein the sensor body is a coplanar meter body.

10. The apparatus of claim 1, wherein the sensor body further comprises multiple pressure inputs configured to provide multiple pressures to the sensor.

11. A system comprising:
  a manifold; and
  a pressure sensor mounted to the manifold, the pressure sensor comprising:
    a header containing a sensor configured to measure differential pressure; and
    a sensor body including a low-pressure side and a high-pressure side and connected to the header, the sensor body and the header forming a pressure vessel configured to receive an input pressure, wherein the sensor is disposed between the low-pressure side and the high-pressure side, and wherein the header is connected to the sensor body such that the input pressure received on an inner surface of the header is substantially equal to the input pressure received on an outer surface of the header; and
    first and second pressure inputs per each of the low-pressure side and the high-pressure side of the sensor body the pressure inputs configured to provide multiple input pressures from at least one of the low-pressure side and the high-pressure side to the sensor, each pressure input comprising:
      a barrier diaphragm associated with each of the first and second pressure inputs configured to move in response to pressure; and
      an overload diaphragm associated with each of the first and second pressure inputs configured to limit movement of the barrier diaphragm, wherein the overload diaphragm is configured to exert a preload force against the sensor body.

12. The system of claim 11, wherein the header comprises:
  a hole through the header;
  an electrical conductor extending through the hole and electrically coupled to the sensor; and
  a compression seal around the electrical conductor and sealing the hole.

13. The system of claim 12, wherein the compression seal comprises a glass-to-metal compression seal.

14. The system of claim 11, wherein a lowest connection point of the header to the sensor body is located at or above a highest point at which the input pressure extends into the header.

15. The system of claim 11, wherein a lower portion of the header is unconnected to the sensor body and extends into an interior volume of the sensor body.

16. The system of claim 11, wherein the header comprises a vent configured to expose the sensor to atmospheric pressure or a lower-pressure input pressure.

17. A method comprising:
  conveying an input pressure to a pressure sensor disposed within a sensor body between a low-pressure side and the high-pressure side of the sensor body from at least one of a low-pressure input and a high-pressure input of the sensor body, wherein each pressure input includes a barrier diaphragm associated with each of the first and second pressure inputs configured to move in response to pressure and an overload diaphragm associated with each of the first and second pressure inputs configured to limit movement of the barrier diaphragm; and
  generating a pressure measurement based on the input pressure using the pressure sensor;
  wherein the pressure sensor comprises:
    a header containing a sensor; and
    a sensor body connected to the header, the sensor body and the header forming a pressure vessel that receives the input pressure; and
  wherein the header is connected to the sensor body such that the input pressure received on an inner surface of the header is substantially equal to the input pressure received on an outer surface of the header.

18. The method of claim 17, wherein the header comprises:
  a hole through the header;
  an electrical conductor extending through the hole and electrically coupled to the sensor; and
  a compression seal around the electrical conductor and sealing the hole.

19. The method of claim 17, wherein a lowest connection point of the header to the sensor body is located at or above a highest point at which the input pressure extends into the header.

20. The method of claim 17, wherein a lower portion of the header is unconnected to the sensor body and extends into an interior volume of the sensor body.

21. The method of claim 17, wherein the header is connected to a cover of the sensor body.

* * * * *